Patented Mar. 25, 1941

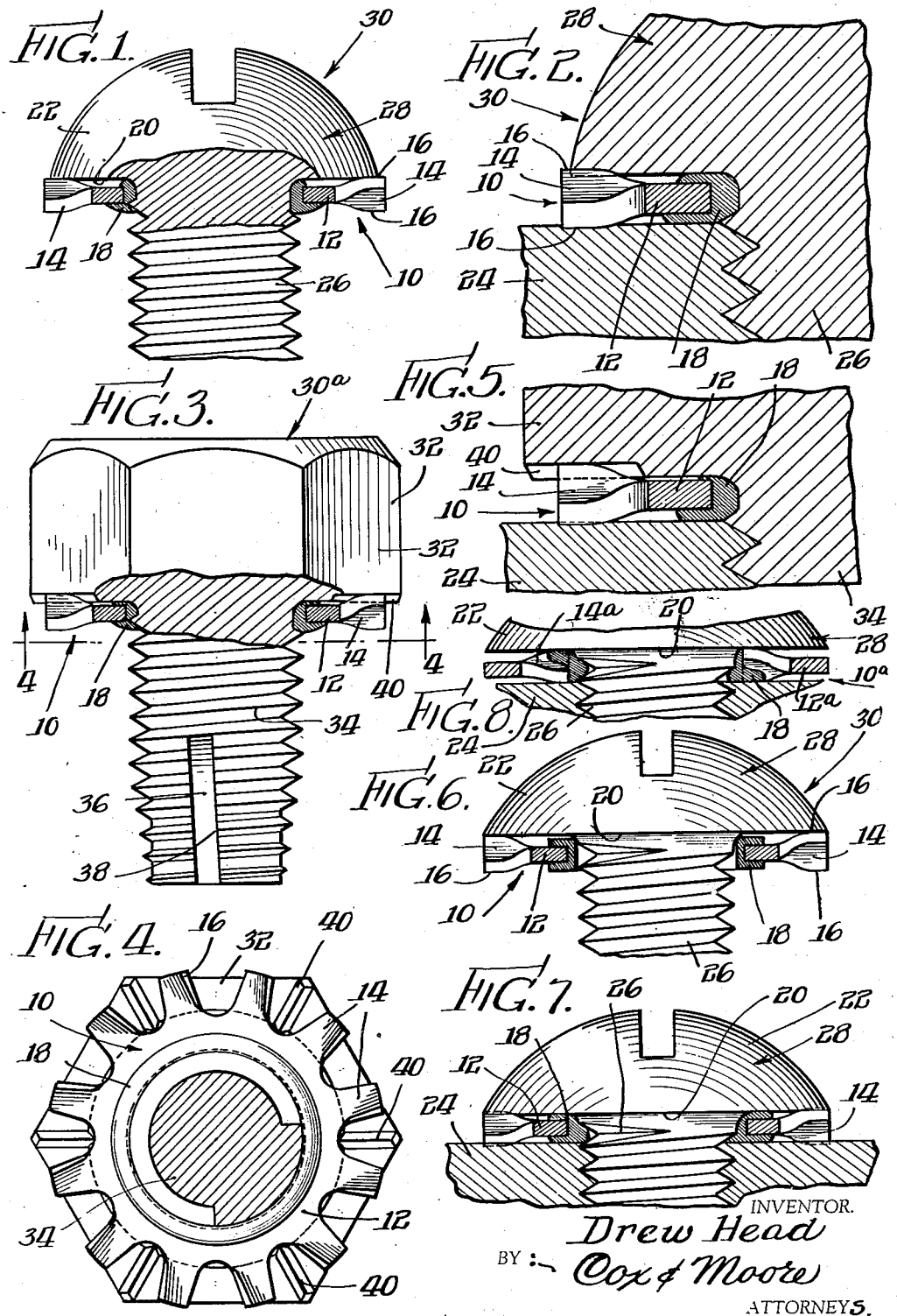

2,236,235

UNITED STATES PATENT OFFICE 2,236,235

FASTENER MEANS AND METHOD OF MAKING SAME

Drew Head, Chicago, Ill., assignor to Illinois Tool Works, Chicago, Ill., a corporation of Illinois Application December 1, 1938, Serial No. 243,415

13 Claims. (Cl. 10—73)

This invention relates generally to fastener units and methods of making same, and more particularly to fastener units in which the lock washer element thereof is secured in sealed relation to a rotary threaded fastener such as a screw.

Screws are frequently used in instances where a tight sealing fit of the clamping surface of the screw head with respect to the work piece is essential; for example, when screws are inserted within threaded apertures of a liquid retainer, the screw head must be firmly tightened against the work piece to prevent leakage of liquid. In such installations, the use of locking means—such as lock washers beneath the screw head—is rendered difficult because it prevents the clamping surface of the screw from being tightened against the work. The present invention contemplates the provision of lock washers of a design which will enable the screw associated therewith to be used in instances where a tight sealing fit is required. To accomplish this, I propose to provide lock washers equipped with a sealing element along the inner margin thereof.

It is a further object of the present invention to provide fastener units comprising a rotary threaded clamping member and lock washer secured in preassembled relation with respect to the clamping surface thereof, which may be produced without the necessity of extruding or swaging material of the rotary fastener after the parts have been preliminarily associated.

More specifically, the invention comprehends the production of fastener units, as set forth above, by gripping the fastener shank with plastic material positioned along the inner margin of the lock washer.

The foregoing and numerous other objects and advantages will be more apparent from the following detail description when considered in connection with the accompanying drawing, wherein—

Figure 1 discloses a combined threaded fastener and lock washer which is representative of one embodiment of the invention, the lock washer and a portion of the screw fastener in the vicinity thereof being shown in section to more clearly illustrate the manner in which the plastic material of the lock washer is molded into preassembled sealing relation with respect to the fastener shank;

Figure 2 is an enlarged, fragmentary sectional view of the device shown in Figure 1 after it has been tightened against a work piece;

Figure 3 discloses the application of the invention to screws of the type adapted to be turned within an unthreaded aperture of relatively hard material such as soft iron and steel, so as to form its own thread therein;

Figure 4 is a transverse sectional view of the fastener shown in Figure 3, said view being taken substantially along the line 4—4 of Figure 3;

Figure 5 is an enlarged, fragmentary sectional view similar to Figure 2, disclosing the fastener unit of Figure 3 operatively associated with a work piece;

Figure 6 discloses a lock washer of the type contemplated by the present invention in preliminary association with a conventional screw member;

Figure 7 discloses the elements of Figure 6 after tightening against a work piece; and Figure 8 discloses the application of the invention to combined screws and lock washers wherein the lock washer is provided with internal locking teeth.

Referring now to the drawing more in detail wherein like numerals have been employed to designate similar parts throughout the various figures, it will be observed that the invention contemplates a lock washer, as disclosed in Figure 6, designated generally by the numeral 10. This lock washer is of the type adapted to be formed or stamped from sheet spring stock and includes an annular body 12 provided along the outer margin thereof with a plurality of locking elements 14. These locking elements 14 are so warped, flexed, or twisted as to present oppositely disposed teeth 16 extending beyond the opposite sides of the body 12. In order to insure increased locking efficiency, I prefer to employ teeth of the type adapted to make a line bite in the material against which said teeth are clamped.

The inner margin of the body 12 carries or supports a plastic sealing element 18. This element may be composed of lead or other suitable material which is readily moldable. In fact, the sealing member 18 serves as a gasket when clamped against a work piece, for example, when the clamping surface 20 of a screw head 22 is clamped against the lock washer, as indicated in Figure 7. Under such circumstances the teeth 16 become embedded within the clamping surface 20 and the complementary surface of the work piece 24, and the lead gasket or sealing element 18 is forced into sealing engagement with the periphery of the screw shank 26. In other words, the sealing material 18 flows into sealing contact with the screw shank, thereby preventing the leakage of fluid or liquid from the aperture of the work piece in which the screw shank 26 is positioned. Were it not for the presence of the sealing member, any fluid in the vicinity of the screw shank would be free to flow along the work surface because the clamping surface of the screw head would not be in clamping engagement with the work piece. Thus by providing the sealing member 18 on the lock washer, the screw is not only secured against inadvertent loosening due to vibration and the like, but is also secured in a leakproof condition upon the work piece.

As thus far described, the invention comprehends lock washers equipped with means such as the sealing element 18, which are designed for application to any conventional screw shank. The invention also contemplates the use of the plastic sealing element 18 as a means for retaining a lock washer and threaded fastener, such as a screw, in operative preassembled relation. That is to say, if the lock washer 10 is secured to the underside of the screw 28, as indicated in Figure 1, the combined elements present a preassembled screw and lock washer or fastener unit designated generally by the numeral 30. While the sealing element 18, when associated with the screw 28, serves in the same capacity as the sealing element shown in Figures 6 and 7, to-wit, as means for sealing against leakage of fluid from the aperture into which the screw shank is inserted, it has an additional function—namely, that of retaining the lock washer and screw together as a preassembled unit prior to the application of the screw to the work piece. In other words, the member 18, in addition to providing a seal, also serves as a fastening or securing means for retaining the teeth of the lock washer in operative preassembled relation with respect to the clamping surface of the screw head. This enables the screw and lock washer as a unit to be shipped to the place of ultimate use or application to the work and precludes the necessity of manually assembling the lock washers and screws at the place where these parts are actually to be applied to the work.

The invention as disclosed in Figures 1 and 2 has a very practical application in instances where the material of the threaded fastener, while soft enough to permit the use therewith of a lock washer of the type disclosed, is hard enough to prevent the satisfactory extrusion of the material of the fastener after the formation of the thread, as by rolling or otherwise. Thus, by using the plastic material along the inner margin of the lock washer, said washer may be applied after the thread has been cut or rolled upon the screw shank, and precludes the necessity of thereafter extruding any part of the threaded fastener to provide abutment or lock washer retaining means.

The invention also contemplates the use of the lock washer 10 in combination with screws which are of such a hardness as to preclude the embedding of washer teeth into the clamping surface of the fastener. Screws of the type designed to form their own thread in an unthreaded aperture of relatively hard material—such as soft iron and soft steel—are of such a hardness as to prevent lock washer teeth from becoming embedded within the clamping surface thereof. The present invention, however, contemplates the use of the lock washer 10 in combination with a thread-forming or thread-cutting fastener 32 (Figures 3 to 5, inclusive) so as to present a screw and lock washer assembly or fastener unit designated generally by the numeral 30a. This screw 32 has a threaded shank 34 which is provided with a recess 36 at its entering end, thereby presenting a serrated cutting edge 38. This screw is of the type particularly adapted to cut its way into an unthreaded aperture of relatively hard material without impairing the configuration of the thread on the screw shank. Because the clamping surface on the head of the screw 32 is of such a hardness as to preclude the embedding of the lock washer teeth therein, I propose to provide along the clamping side of the screw head a plurality of radial abutments or teeth 40.

In the fastener unit 30a the lock washer 10 is retained in position beneath the screw head by the plastic material 18, said material being pressed into snug fitting or sealing engagement with the portion of the screw shank immediately adjacent the screw head. The lock washer teeth 16 on the free or bottom side are adapted to embed themselves within the work piece when tightened thereagainst, and the teeth 16 on the opposite sides are adapted to interlock or engage with the abutments 40 so as to secure the screw against inadvertent retrograde movement.

In Figure 8 I have shown the application of the invention in instances where lock washers of the internally toothed type are employed. In Figure 8 this lock washer is indicated generally by the numeral 10a, and comprises a resilient body 12a provided along its inner margin with a plurality of twisted prongs or locking elements 14a, which provide oppositely disposed teeth similar to the teeth 16 previously described. The sealing or impressionable material 18 is located along the inner margin of the washer so as to present sealing means or means for securing the lock washer and screw together as a preassembled fastener unit.

From the foregoing it will be apparent that the present invention contemplates a new lock washer design wherein the inner margin thereof is provided with a plastic, formative or impressionable element which is adapted to flow when pressed between the clamping surface of a fastener head and the complementary surface of a work piece. The flowing of this plastic material serves a dual purpose—namely, as a seal with respect to the fastener shank and as a lock washer retaining means. By the use of lock washers having a plastic inner margin, the ease with which fastener units, to-wit, combined threaded fasteners and lock washers, is materially enhanced, and this is particularly true in instances where the material of the fastener is such as not to warrant extrusion or upsetting after the lock washer has been preliminarily associated with a threaded shank in the vicinity of the clamping surface of the fastener.

Obviously the invention is not limited to the specific structural arrangement disclosed herein, but is capable of other modifications and changes without departing from the spirit and scope of the present invention.

Having thus described my invention, what I claim as new and desire to secure by Letters Patent is:

1. A lock washer including a body and resilient locking teeth projecting in opposite directions beyond said body, and comprising an integral coating of relatively impressionable material disposed radially inwardly of the inner margin of the body, whereby to enable same to be pressed into engagement with a complementary rotary threaded fastener.

2. A lock washer including a body and resilient locking teeth projecting in opposite directions beyond said body, and a coating of impressionable material at the inner margin of the washer stock adapted to be pressed into engagement with a complementary threaded fastener.

3. A lock washer including a continuous annular body, resilient locking teeth formed integral with and spaced along the outer margin of said annular body, said teeth projecting in opposite directions beyond the bounding planes of said body, and a coating of ductile material disposed beyond the inner margin of said body adapted to be pressed into engagement with a complementary rotary threaded fastener.

4. A lock washer including a body, resilient locking teeth projecting in opposite directions beyond said body, and impressionable material carried by the inner margin of the washer stock, said impressionable material in radial cross-section being U-shaped and embracing said inner margin of the lock washer and the opposite faces thereof.

5. A fastener unit including a rotary threaded fastener having a clamping surface and a shank portion extending axially beyond said clamping surface, a lock washer adjacent said clamping surface, said lock washer including a body portion and resilient teeth projecting beyond opposite sides thereof, and a coating of relatively ductile material on the inner margin of the lock washer and interposed between the inner margin of the lock washer and the fastener shank with the ductile material grippingly deformed about the shank, whereby to retain said lock washer in operative preassembled relation with respect to said clamping surface.

6. A fastener unit including a screw member having a head and threaded shank, a lock washer encircling said shank adjacent said head, said lock washer including a body portion and resilient teeth projecting beyond opposite sides thereof, a coating of relatively impressionable material on the inner margin of the washer stock providing an inner diameter which is less than the external diameter of the screw thread with the impressionable material grippingly deformed about the threaded shank, whereby to retain said lock washer in operative preassembled relation with respect to the screw head.

7. A fastener unit including a rotary threaded fastener having a relatively hard clamping surface and a shank portion extending axially beyond said clamping surface, a lock washer adjacent said clamping surface, said lock washer being softer than said clamping surface and including a body portion and resilient teeth projecting beyond opposite sides thereof, abutment means associated with said clamping surface for interlocking with the teeth projecting from one side of the body, and a coating of relatively impressionable material on the inner margin of the lock washer and said shank portion and interposed between said inner margin and said shank and grippingly deformed upon the shank, whereby to retain said lock washer in operative preassembled relation with respect to said clamping surface.

8. The method of preassembling rotary threaded fasteners having a clamping surface and a shank portion extending axially beyond said clamping surface with a lock washer having a body portion and resilient teeth projecting beyond opposite sides thereof, which consists in preliminarily associating the lock washer with the clamping surface, and pressing plastic material into interlocking engagement between the inner margin of the washer and the shank portion.

9. The method of preassembling rotary threaded fasteners having a clamping surface and a shank portion extending axially beyond said clamping surface with a lock washer having a body portion and resilient teeth projecting beyond opposite sides thereof, which consists in applying impressionable material to the inner margin of the washer stock, associating the washer and impressionable material with the clamping side of the screw head, and pressing said impressionable material into engagement with said shank portion so as to effect the preassembly of the lock washer with the threaded fastener.

10. A lock washer including a body and resilient locking teeth projecting in opposite directions beyond said body along the inner margin thereof, and comprising a coating of relatively impressionable material disposed radially inwardly of the inner margin of said internal teeth adapted to be pressed into gripping engagement with a complementary threaded fastener.

11. A fastener unit including a rotary threaded fastener having a clamping surface and a shank portion extending axially beyond said clamping surface, a lock washer adjacent said clamping surface, said lock washer including an annular body portion and internal resilient teeth projecting beyond opposite sides thereof, and a layer of relatively impressionable material interposed between the inner extremities of said internal teeth and fastener shank and yieldably gripping both, whereby to retain said lock washer in operative preassembled relation with respect to said clamping surface.

12. A lock washer including a body, resilient locking teeth projecting in opposite directions beyond the body for locking engagement with opposed work surfaces when the lock washer is clamped therebetween, and a section of impressionable material carried within the inner margin of said washer stock, said relatively impressionable material having portions extending axially in opposite directions beyond the faces of said body a substantial distance for compressive engagement by opposed work surfaces when the lock washer is clamped therebetween, and an intermediate portion circumferentially restrained by said lock washer and operative to grippingly engage the body of a fastener disposed axially therethrough.

13. A preassembled fastener unit including a rotary threaded fastener having a clamping surface and a threaded shank portion extending axially beyond the clamping surface, a washer formed of sheet material having a central aperture and including a continuous body portion extending radially outwardly for engagement with opposed work surfaces when the washer is clamped therebetween, said washer further including an inner sealing section of malleable metal carried within the inner margin of said body portion, said inner metallic sealing section being of substantially greater axial thickness than the section of said body portion extending outwardly therefrom and extending axially beyond at least one axial face of said body a substantial distance for compressive engagement by opposed work surfaces when the washer is clamped therebetween, said washer being disposed on the shank with the malleable material of said inner sealing section adapted to be permanently deformed upon said shank for sealing purposes in response to pressure exerted by said clamping surface.

DREW HEAD.